United States Patent
Link et al.

(10) Patent No.: US 10,712,043 B2
(45) Date of Patent: Jul. 14, 2020

(54) AIR VENT

(71) Applicant: GRAMMER Interior Components GmbH, Hardheim (DE)

(72) Inventors: Manfred Link, Mudau (DE); Pierre Stehle, Rosbach (DE); Gunter Link, Buchen/Hainstadt (DE); Christian Schreck, Koenigheim (DE)

(73) Assignee: GRAMMER Interior Components GmbH, Hardheim (DE)

( * ) Notice: Subject to any disclaimer, the term of this patent is extended or adjusted under 35 U.S.C. 154(b) by 336 days.

(21) Appl. No.: 15/612,573

(22) Filed: Jun. 2, 2017

(65) Prior Publication Data

US 2017/0370611 A1    Dec. 28, 2017

(30) Foreign Application Priority Data

Jun. 27, 2016   (DE) .................... 20 2016 103 388 U

(51) Int. Cl.
| | |
|---|---|
| *F24F 13/15* | (2006.01) |
| *B60H 1/34* | (2006.01) |
| *F24F 13/075* | (2006.01) |
| *F24F 13/06* | (2006.01) |

(52) U.S. Cl.
CPC ............. *F24F 13/15* (2013.01); *B60H 1/345* (2013.01); *B60H 1/3421* (2013.01); *F24F 13/06* (2013.01); *F24F 13/075* (2013.01); *B60H 2001/3471* (2013.01)

(58) Field of Classification Search
CPC .......... F24F 13/15; F24F 13/06; F24F 13/075; B60H 1/3421; B60H 1/345; B60H 2001/3471

USPC ......................................................... 454/313
See application file for complete search history.

(56) References Cited

U.S. PATENT DOCUMENTS

| | | | | |
|---|---|---|---|---|
| 2,892,395 | A | | 6/1959 | Goettl |
| 2,959,117 | A | | 11/1960 | Wright et al. |
| 5,036,753 | A | * | 8/1991 | Ostrand ................. B60H 1/345 454/155 |
| 5,364,303 | A | * | 11/1994 | Terry ..................... B60H 1/345 454/155 |
| 5,520,579 | A | * | 5/1996 | Saida ..................... B60H 1/345 454/155 |
| 6,159,092 | A | | 12/2000 | Elder |

(Continued)

FOREIGN PATENT DOCUMENTS

| | | |
|---|---|---|
| DE | 10057421 | 5/2002 |
| DE | 10330621 A1 | 2/2005 |

(Continued)

*Primary Examiner* — Edelmira Bosques
*Assistant Examiner* — Dana K Tighe
(74) *Attorney, Agent, or Firm* — Von Rohrscheidt Patent

(57) ABSTRACT

The invention relates to an air vent including a housing; plural louvers extending horizontally or vertically, pivotably arranged in the housing and aligned relative to an air outlet opening arranged in the housing, wherein the plural louvers are controllable jointly with an identical orientation by a pivot movement from a starting position into a pivot position by an adjustment device for changing an air outflow direction from the air outlet opening, wherein the plural louvers are controllable by at least one actuation element made from a shape memory alloy to adjust a diffuse air flow independently from a control by the adjustment device.

7 Claims, 4 Drawing Sheets

(56) References Cited

U.S. PATENT DOCUMENTS

| | | | |
|---|---|---|---|
| 6,800,023 B2* | 10/2004 | Demerath | F24F 13/15 |
| | | | 454/155 |
| 2002/0094774 A1 | 7/2002 | Demerath | |
| 2007/0123158 A1* | 5/2007 | Shibata | B60H 1/00871 |
| | | | 454/130 |

FOREIGN PATENT DOCUMENTS

| | | |
|---|---|---|
| DE | 10330621 A1 | 2/2005 |
| DE | 102004046273 A1 | 4/2006 |
| DE | 112007000934 T5 | 2/2009 |
| DE | 102010014528 A1 | 11/2010 |
| DE | 102015101116 A1 | 8/2015 |
| JP | S57124647 | 8/1982 |
| JP | S61262543 A | 11/1986 |

\* cited by examiner

AIR VENT

RELATED APPLICATIONS

This application claims priority from and incorporates by reference German Utility Model Application DE 20 2016 103 388.8 filed on Jun. 27, 2016.

FIELD OF THE INVENTION

The invention relates to an air vent with a housing including plural louvers which extend horizontally or vertically and which are pivotably arranged in the housing.

BACKGROUND OF THE INVENTION

An air vent of this general type is known from DE 100 57 421 A1. The air vent includes plural louvers that are oriented parallel to each other in a plane of an air outlet opening wherein the louvers are adjustable simultaneously or jointly through an adjustment device by an operating element in order to provide a change of an outflow direction. In this air vent the louvers are connected with each other by a transmission so that the louvers are adjustable from a neutral outlet position where they are aligned jointly and parallel to each other into a first end position and a second end position that is oriented opposite to the first end position by a pivot movement or the operating element.

The requirements placed upon air vents increase continuously. Simply changing the outlet direction of the air flow does not suffice anymore. Rather there is also a requirement to control a diffuse air flow.

BRIEF SUMMARY OF THE INVENTION

Thus, it is an object of the invention to propose an air vent which facilitates an adjustment of the outlet direction of the air flow by adjusting a position of the louvers and also generates a diffuse air flow.

The object is achieved by an air vent in which in addition to the adjustment device that adjusts a flow direction by jointly and identically arranging the louvers in a starting position or in a neutral position as well as also in a pivoted position by a pivot movement to change and angle of attack at least one adjustment element is provided that is made from a memory alloy which controls the louvers for adjusting a diffuse air flow. Through the at least one actuation element made from the memory alloy the louvers are positionable to control a pivot movement through the adjustment device to orient the air outlet direction so that a diffuse air flow is generated instead of a laminar oriented air flow.

It is advantageously provided that the louvers are controllable starting from a starting position into a position of diffused air flow by the actuation element made from the shape memory alloy, wherein starting from a center louver or a control louver a first right louver and a left adjacent louver is aligned with an increased opening angle compared to a parallel orientation relative to the center louver and a second right louver and left adjacent louver has an increased opening angle relative to the first right and left adjacent louver. Thus, the louvers are positioned with an increasing larger opening angle starting from the left louver to the outer rim of the air outlet opening so that a diffuse air flow is generated. For example an opening angle of 11° can be provided between the center louver and a first adjacent louver, between the first adjacent louver and the second adjacent louver an opening angle of 11° can also be provided, wherein a total opening angle of for example 22° is then provided from the center louver to the second adjacent louver. This continues analogously for additional adjacent louvers that are arranged further outside.

The adjustment device of the air vent includes a support rail in which a slide is received that is coupled respectively with one louver and each slide is arranged at a distance from the louver in a disengageable interlocking position relative to the guide rail. This facilitates that the adjustment device can be actuated by an operating element, so that the slides are jointly movable in a provided position together with the support rail in order to obtain the change in the outflow direction. It is facilitated by the disengageable interlocking position between the slide and the support rail that the slides can also leave the disengageable locking position due to the control by the actuation element made from the shape memory alloy in order for the louvers to move into opening angles that differ from each other in order to generate the diffuse air outflow.

It is advantageously provided that a coupling element is provided at each slide, in particular a fork shaped or U-shaped receiver in which a pinion is supported that is arranged at an end section of the louver. This facilitates a simple connection between the louver and the slide in order to pivotably control the louver that is arranged fixated in place at the housing.

Another advantageous embodiment of the invention provides that the operating element of the adjustment device controls a linear displacement movement of the support rail in order to adjust a flow out direction of the air flow. Thus, all louvers can simultaneously perform a pivot movement and can be adjusted and changed with equal orientation, in particular oriented parallel to each other within their entire pivot range. Advantageously it is provided that the linear displacement movement of the support rail is controlled parallel to the plane of the air outlet opening. Thus, also a space saving arrangement can be provided within the housing of the air outlet louver. Advantageously the operating element can be manually adjustable. Advantageously a sliding movement can be provided that is guided by a blind. Alternatively the operating element can be configured as an electrical switch or keying device or also as a touch screen through which an electrical drive controls a linear displacement movement of the guide rail.

In order to control the louvers a pinion is advantageously provided at a center louver or at a control louver wherein the operating element of the adjustment device engages the pinion and wherein a sliding movement or rotating movement of the operating element controls a linear displacement movement of the support rail. The sliding movement is transmitted through the pinion of the center louver or of the control louver to the slide coupled therewith and from the slide to the support rail.

In order to control the diffuse air flow at least one actuation element made from the shape memory alloy is coupled with or between two or plural slides of the support rail. Advantageously the at least one actuation element extends along all slides and each slide is connected by a fixed engagement point with the at least one actuation element. This facilitates a simultaneous control of all slides with the at least one actuation element and thus a simultaneous control of all louvers. Advantageously one actuation element extends from a first slide to a last slide so that an inline arrangement or serial arrangement of the slides is provided. This facilitates an actuation motion of the slides as a function of each other in order to control the diffuse air flow.

In order to control the diffuse air louvers it is advantageously provided that each slide includes a first interlocking element which cooperates with a second interlocking element of the support rail and which forms a disengageable interlocked connection. Thus, it is facilitated that the slide is removed from its interlocked position when the actuation element made from a shape memory alloy is activated so that the slide can take a position that differs from the adjacent slide in order to control opening angles of the adjacent louvers that differ from each other.

Controlling the adjustment path of the louvers for the diffuse air outflow is performed by an activation, in particular electrical current loading of the actuation element made from the shape memory alloy. The free lengths of the adjustment elements between two slides are thus shortened which adjusts the opening angles. When for example the center louver or the control louver is provided with a disengage able interlocking connection which has a higher disengagement torque than the adjacent interlocking connection the slides that are adjacent on the right side and on the left side of the center louver or the control louver are disengaged from the interlocking position. Shortening a free length between two slides by the same amount, however, controls a greater movement distance at the outer most slide than at the slide that is directly adjacent to the center louver or the control louver so that a larger opening angle is adjusted.

According to an advantageous embodiment of the air outlet the slide which is associated with a center louver or a control louver has a disengageable interlocking connection with a higher disengagement force or a higher disengagement torque than the disengageable interlocking connection of the adjacent slides which controls the louvers that are adjacent to the center louver or the control louver. Thus, for example the center louver or the control louver remains oriented when the adjustment element is being controlled and the adjacent louvers enter into an angular arrangement relative to the center louver or the control louver. With an increasing distance of the louvers to the center louver or the control louver the louvers advantageously have an ever increasing relative angular orientation.

Alternatively the slide of a center louver or a control louver can have a friction and/or form locking connection with the control element, thus instead of a higher disengagement force or a higher disengagement torque of the disengageable interlocking connection also a fixed connection between the control element and the slide can be provided which is associated with a center louver or a control louver.

It is advantageously provided that a reset element, advantageously a spring element is provided between two slides. Thus, after activating the control element made from the shape memory alloy a self-acting reset of the slides can be performed into the respective disengageable interlocking position at the support rail.

BRIEF DESCRIPTION OF THE DRAWINGS

The invention and other advantageously embodiments and variations thereof are subsequently described in more detail based on embodiments illustrated in the drawing figures. The features that can be derived from the description and the drawing figures can be used individually by themselves or in any combination, wherein.

DETAILED DESCRIPTION OF THE INVENTION

Figure 1:
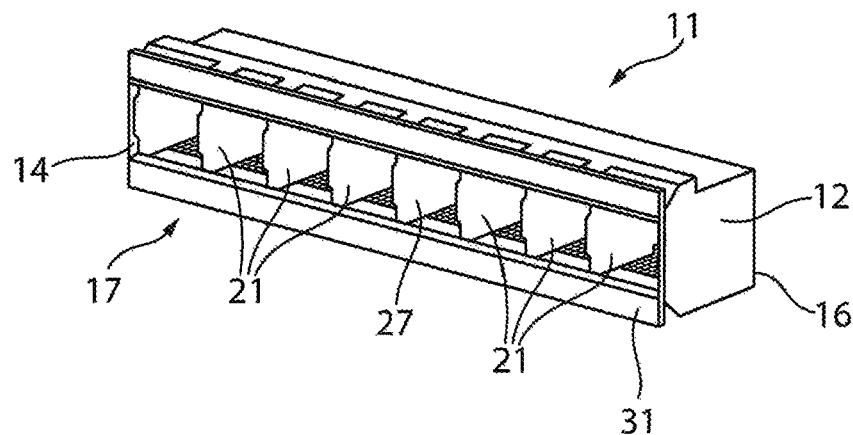
FIG. 1 illustrates a perspective front view of an air vent.
Figure 2:
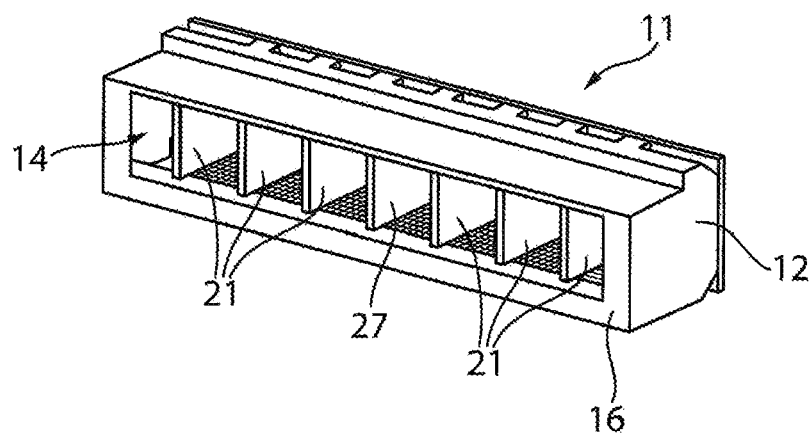
FIG. 2 illustrates a perspective view from behind of the air vent according to FIG. 1.

FIG. 1 illustrates a perspective front view and FIG. 2 illustrates a perspective rear view of an air vent 11. The air vent 11 includes a housing 12 with an air guide channel 14. The air channel 14 is defined by a rear connection surface 16 of the housing 12 and an air outlet opening 17 at a front side of the housing 12. The air outlet opening 17 is advantageously arranged in a face 19 of the housing 12 which can also be configured as a decorated surface. In the embodiment plural louvers 21, 27 are inserted into the air channel 14. The louvers are for example oriented vertically. Alternatively the louvers 21, 27 can also be oriented horizontally. An adjustment device 24 is provided at a base 23 of the housing 12, wherein the adjustment device initiates a pivot movement of the louvers 21, 27.

Figure 3:
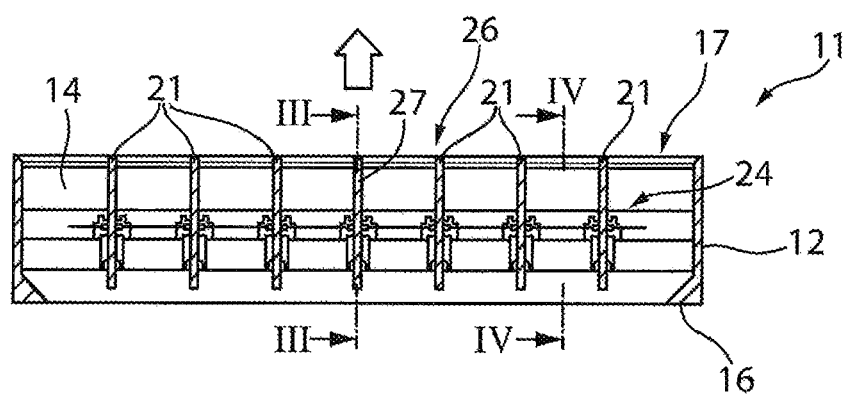
FIG. 3 illustrates a schematic sectional view of the air vent according to FIG. 1.

FIG. 3 illustrates a schematic sectional view of the air vent 11. From this sectional view it can be derived that the louvers 21, 27 are arranged in a starting position 26 or a neutral position so that an outflow is provided along a longitudinal center axis of the air channel 14.

Figure 4:
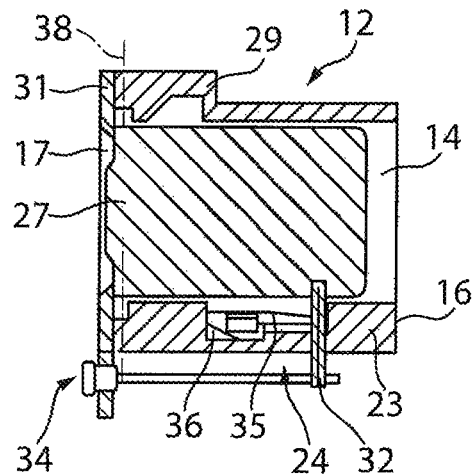
FIG. 4 illustrates schematic sectional view along the line III-III in FIG. 3.

FIG. 4 illustrates a schematic sectional view along the line III-III in FIG. 3. This sectional view shows a center louver or control louver 27. The control louver 27 as well as the additional louvers 21 are e.g. pivotably supported in the housing 12 by plug in pinions 28. For example a respective U-shaped recess can be provided at a ceiling 29 and at the base 23 so that the louvers 21 are inserted from the air outlet side into the air channel 14 and engage a plug in pin 28 in the U-shaped recess and subsequently attach a blind 31 at the housing 12, in particular by a clip connection in order to fixate the plug in pins 28 rotatably in the ceiling 29 and in the base 23 of the housing 12. Alternatively the louvers 21 can be inserted into bore holes in the housing 12 by spring elastic lobes.

The control louver 27 includes a control pin 32 on an air inflow side of the housing 12 wherein the control pin extends through the base 23 of the housing 12 in an outward direction. An operating element 34 engages the control pin 32, wherein the operating element is connected directly or indirectly through connecting rods or transmission similar with the control pin 32. The control pin 32 is in turn coupled with a slide 35 which is in turn received by a support rail 36.

Figure 5:
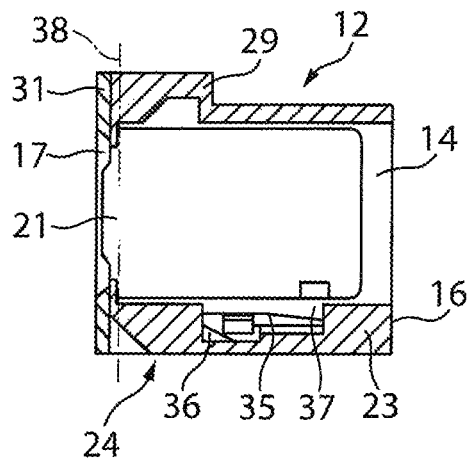
FIG. 5 illustrates a schematic sectional view along the line IV-IV in FIG. 3.

FIG. 5 illustrates a schematic sectional view along the line IV-IV in FIG. 3. Thus, a louver 21 is illustrated in a side view within the housing 12. The pivotable reception of the louver 21 corresponds to the control louver 27. At an end section of the louver 21 a support pin 37 is provided which is configured shortened relative to the control pin 32, so that the control pin 32 reaches only partially into the base 23, so that the support pin 37 is coupled with a slide 35 of the support rail 36. All louvers 21 that are adjacent to the control louver 27 are provided with the support pins 37 so that controlling the louvers 21, 27 is performed jointly by a displacement of the support rail 36 which simultaneously causes a displacement of the respective slide 35 relative to the pivot axis 38 of the louvers.

Figure 6:
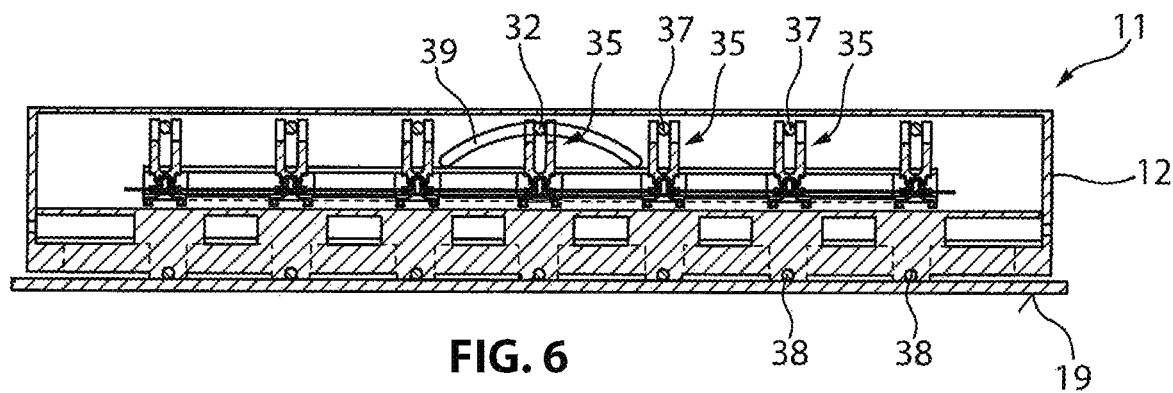
FIG. 6 illustrates another schematic sectional view of the air louver according to FIG. 1.

FIG. 6 illustrates an additional schematic sectional view of the air outlet 11 according to FIG. 3. The sectional plane is arranged between the louvers 21, 27 and a base 23 in the housing 12. This illustrates the build-up of the adjustment device 24. Each louver 21, 27 is supported at the housing so that it is pivotable about a pivot axis 38. FIG. 6 illustrates a stump or pinion of the louvers 21 and the control louver 27 in the pivot axis 38. Opposite thereto the control pinion 32 of the control louver 27 as well as the additional support pins of the louvers 21 are illustrated. Respective slides 35 engage the control pinion 32 and the support pinion 37 wherein the slides are movably supported in the support rail 36. This is subsequently described in more detail based on FIGS. 9 and 11. A support 39 is arranged at or in the base 23 of the housing 12, in particular a support groove. Actuating the operating element 34 which is for example movably supported in the cover 31 the control pinion 32 is pivoted to the right or to the left and moved displaced along the support groove 39. This initiates a displacement movement of the support rail 36 so that all slides 35 together with the support rail 36 can be moved to the left and to the right accordingly. Thus, the control pinion 32 can move inward within the fork shaped configuration of the slide 35. Thus, a circular arc shaped movement of the control pin 32 is transposed into a translatoric movement of the support rail 36. The control louver 27 and the additional louvers 21 are pivoted about the pivot axis 38.

Instead of the operating element 34 which is manually operated also a motorized control can be provided. Thus, a displacement movement of the louvers 21 can be controlled by the operating element 34. The translatoric movement of the support rail can also be controlled directly. The motorized control can be performed by a pressure or control keying device or a touch screen.

Figure 7:
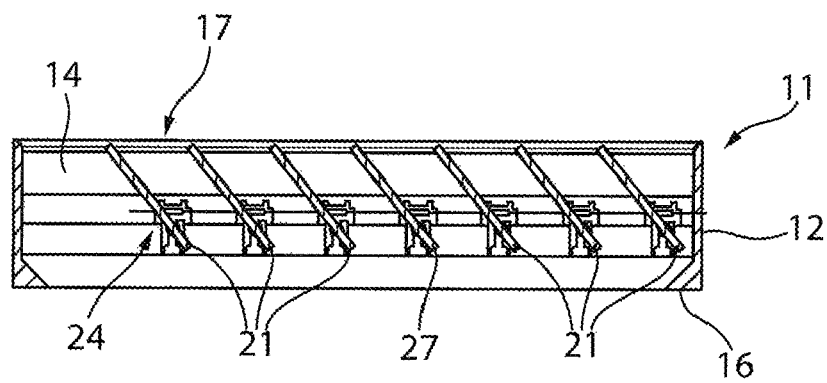
FIG. 7 illustrates a schematic sectional view of the air vent with a first orientation of the louvers.

FIG. 7 illustrates a schematic sectional view of the air vent 11 according to FIG. 1 in which the louvers 21, 27 are pivoted to the left starting from a starting position according to FIG. 3. In this end position for example the support bin 32 is moved within the support groove 39 to the right end in the support groove 39. In this end position for example a pivot range of −40° can be assumed.

Figure 8:
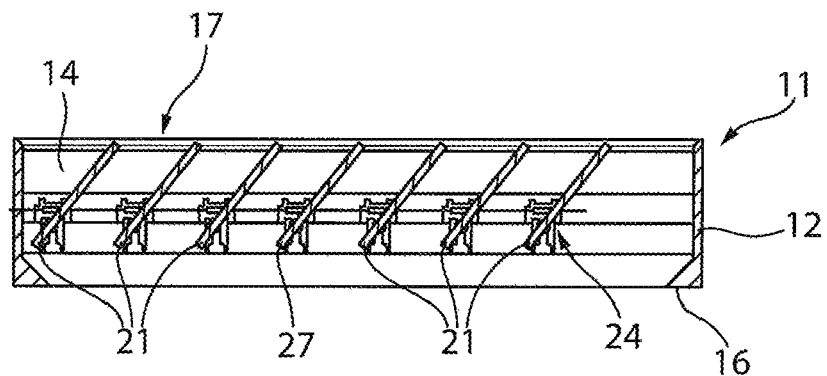
FIG. 8 illustrates a schematic sectional view of the air vent according to FIG. 1 with a second orientation of the louvers.

FIG. 8 illustrates a schematic sectional view of the air outlet 11 according to FIG. 1 in which the louvers 21, 22 are pivoted in an opposite direction relative to FIG. 6, for example by a pivot range of 40° relative to the starting position 26 in FIG. 3. From the comparison of the two FIGS. 7, 8 it is evident that a displacement of the support rail 36 simultaneously causes a change of the louvers 21, 27 and the louvers 21, 27 always remain oriented parallel to each other in a neutral position and/or a starting position 26 as well as in the two pivot ranges according to FIGS. 6 and 7.

The adjustment device 24 can thus be actuated so that the operating element 34 performs for example a displacement that is oriented horizontal relative to the air outlet opening and pivots the louvers 21, 27 accordingly. Alternative control options can be provided wherein accordingly configured transmission rod linkages or drive arrangements are provided between the actuation element 34 and the control pinion 32.

Figure 9:
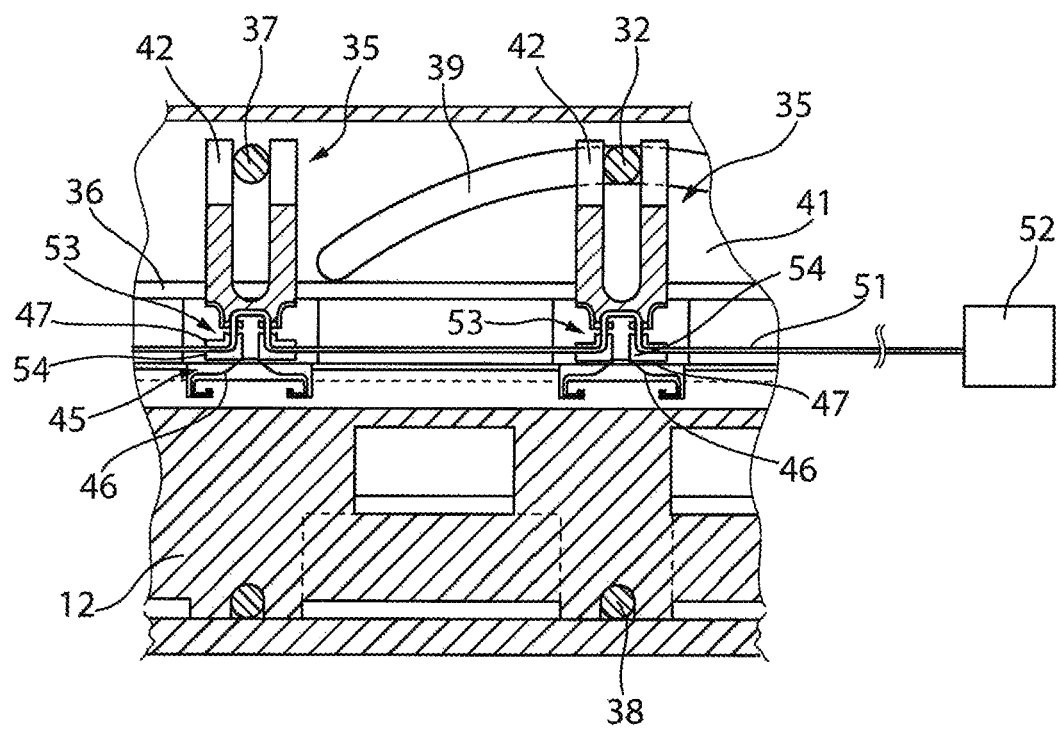
FIG. 9 illustrates a schematic enlarged arrangement of an adjustment device and of a thermal adjustment element made from a shape memory alloy for changing the flow out direction in a starting position.

FIG. 9 illustrates a blown up detail of the adjustment device 24. In the support rail 36 plural slides 35 are arranged in a recess 41 so that they are movable along the recess 41. The slides 35 include a coupling element 42 which receives the control pinion 32 or the support pinions 37. This coupling element 32 is configured as a U-shaped fork so that a simple arrangement of the control pinion 32 facilitates controlling the pivot movement of the louvers 21, 27.

Each of the exemplary slides 35 is arranged in a disengageable interlocked position in the support rail 36. The distance of the disengageable interlocked positions 45 from each other corresponds to the distance of the pivot axes 38 of the louvers 21, 27. In this disengageable interlocked position 45 a first interlocking element 46 is provided which is configured for example as a spring element. The spring element cooperates with a second interlocking element 47 which is fixated at the slide 35 and forms a disengageable interlocking connection. In case a control movement is controlled by the operating element 34 a displacement of the control pin 32 is provided wherein the displacement is transferred to the slide 35. Due to the disengageable interlocked connection the control movement is transferred upon the entire support rail 36 so that the support rail 36 is displaceable within a receiver in the base 23 of the housing 12 to the right and to the left in order to assume the pivot position according to FIG. 7 or 8 as well as a neutral position according to FIG. 3.

The individual slides 35 are furthermore connected with each other by at least one connecting element 51 made from a shape memory alloy. This actuation element 51 is configured for example as a wire. Alternatively also plural wires or a wire bundle can jointly form the actuation element 51. For a shape memory alloy for example cryo-materials in particular nickel/titanium, or nickel-titanium-copper can be used. By the same token additional generally known shape memory alloys can be used.

The actuation element 51 is connected with the slide 35 through a fixed engagement point 53. In the portion of the engagement point 53 additionally an insulation sleeve 54 or a protective sleeve can be provided in order not to damage the actuation element 51 when fixating the actuation element relative to the slide. Advantageously an actuation element 51 extends along all slides 35 that are received by the support rail 36. At a respective end of the support rail 36 the actuation element 51 is connectable or connected with an electric cable that leads to a control device 52. The control device 52 can be actuated by an operating element in order to control the diffuse air flow, or turn it on and off.

The adjustment element 51 is activated by an operating element in particular a switch by electrical current loading. Thus, a shortening of the free length of the actuation element 51 is performed between two slides 35. The disengageable locking position 45 is set with respect to the retaining force or the disengagement force so that the disengage able interlocking connections 45 disengage when the actuation element 51 is loaded with current and thus a displacement movement of the slide 35 in the support rail 36, in particular in the recess 41 is controlled and the at least one slide 35 moves from the disengageable locking position.

Figure 10:
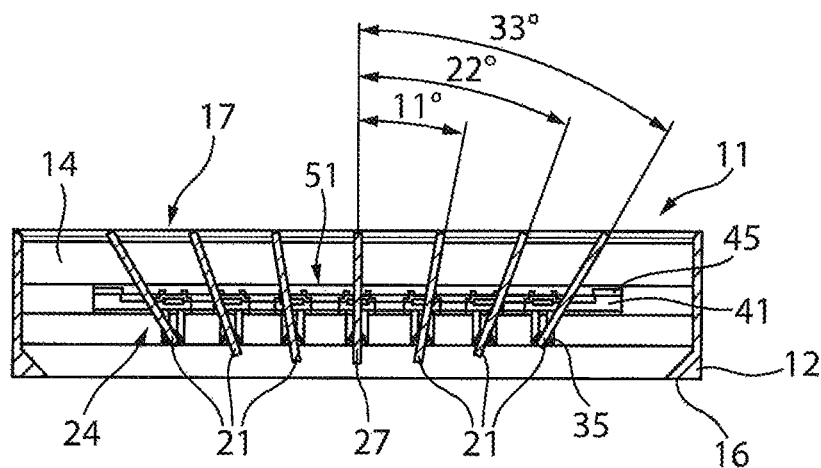
FIG. 10 illustrates a schematic sectional view of the air vent according to FIG. 1 with an arrangement of the louvers for a diffuse air flow.

FIG. 10 illustrates a schematic sectional view of the air outlet 11 according to FIG. 1 in which the louvers 21, 27 are configured for a diffuse air out flow. The arrangement of the louvers 21, 27 is controlled by the electrical current loading of the at least one adjustment element 51 made from the shape memory alloy. For example the control louver 27 is supported with a higher disengagement force in its center position than the adjacent louvers 21. Shortening the actuation element 51 adjusts for example the first right adjacent louver 21 and the left adjacent louver with an opening angle of for example 11° relative to the control louver 27. Since the adjustment travel of the second adjacent louver 21 sums up through two shortenings of the free length of the adjustment element 51 for example the angle of 22° can be adjusted. This applies analogously to the outermost louver so that for example an angle of 33° can be adjusted.

The adjustment of the size of the louvers 21, 27 is performed as a function of a free length of the actuation element 51 between the slides and/or due to the selection of the shape memory alloy and/or the control of the shape memory alloy.

Figure 11:
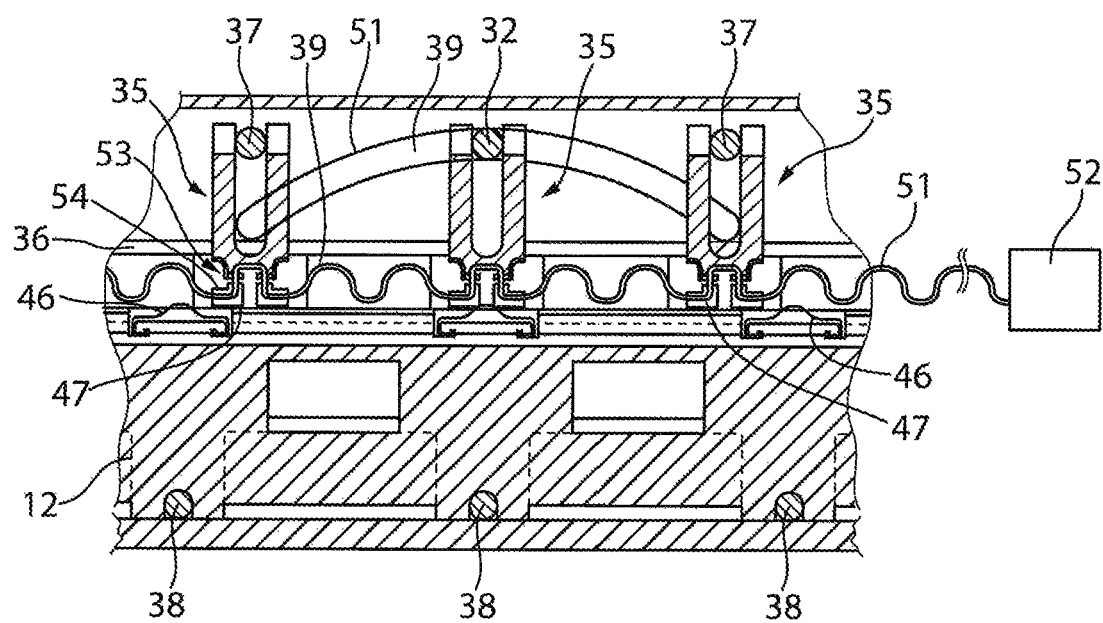
FIG. 11 illustrates a schematic enlarged arrangement of the adjustment device and the thermal adjustment element made from the shape memory alloy in an arrangement for a diffused air outflow according to FIG. 10.

FIG. 11 schematically illustrates the arrangement of the slide 35 of the control louver 27 and two adjacent louvers 21 which are moved by the current loading of the at least one adjustment element 51 from the starting position into a diffused position in an enlarged view. Shortening the adjustment element 51 moves the right and the left adjacent slide 35 of the louver 21 respectively in a direction towards the control louver 27 which yields an angular arrangement of the adjacent louvers 21 with respect to the control louver 27 due to the pivot axis 38 of the louvers 21 permanently provided in the housing as illustrated in FIG. 10.

In order to reset the louvers 21, 27 from the diffuse air outlet position into a neutral position the electrical current loading of the at least one adjustment element is switched off. Advantageously the slides 35 are reset by a non-illustrated reset element back into their disengageable interlocking position which reset element is also provided between the two adjacent slides 35. Alternatively the reset can be performed by the shape memory element and/or another shape memory element. Thereafter a pivot movement of all louvers 21, 27 is controllable by the adjustment device 24 or at least by the adjustment element 51.

What is claimed is:

1. An air vent, comprising: a housing; plural louvers extending horizontally or vertically, pivotably arranged in the housing and aligned relative to an air outlet opening arranged in the housing,
    wherein the plural louvers are controllable jointly with an identical orientation by a pivot movement from a starting position to a pivot position by an adjustment device so that an air outflow direction from the air outlet opening is changed,
    and wherein the plural louvers are controllable by at least one actuation element made from a shape memory alloy to adjust a diffuse air flow independently from a control of the plural lovers by the adjustment device;
    wherein the at least one actuation element made from the shape memory alloy is coupled with or between two or plural slides of a support rail.

2. The air vent according to claim 1, wherein a free length of the actuation element made from the shape memory alloy between two slides shortens upon an activation of the actuation element made from the shape memory alloy and moves at least one slide from a disengageable interlocking position.

3. The air vent according to claim 1, wherein a slide of a center louver or a control louver has a disengageable interlocking connection with a higher disengagement force or with a higher disengagement torque than a disengageable interlocking connection of an adjacent slides which control louvers that are adjacent to the center louver or the control louver.

4. The air vent according to claim 1, wherein a slide of a center louver or a control louver has a friction locking or form locking connection with the actuation element.

5. The air vent according to claim 1, wherein a reset element or a spring element is provided between two slides.

6. An air vent, comprising: a housing; plural louvers extending horizontally or vertically, pivotably arranged in the housing and aligned relative to an air outlet opening arranged in the housing,
    wherein the plural louvers are controllable jointly with an identical orientation by a pivot movement from a starting position to a pivot position by an adjustment device so that an air outflow direction from the air outlet opening is changed,
    and wherein the plural louvers are controllable by at least one actuation element made from a shape memory alloy to adjust a diffuse air flow independently from a control of the plural louvers by the adjustment device,
    wherein the at least one actuation element made from the shape memory alloy extends along all slides in a support rail and each slide is connected at a fixed engagement point with the at least one actuation element made from the shape memory alloy.

7. An air vent, comprising a housing; plural louvers extending horizontally or vertically, pivotably arranged in the housing and aligned relative to an air outlet opening arranged in the housing,
    wherein the plural louvers are controllable jointly with an identical orientation by a pivot movement from a starting position to a pivot position by an adjustment device so that an air outflow direction from the air outlet opening is changed;
    and wherein the plural louvers are controllable by at least one actuation element made from a shape memory alloy to adjust a diffuse air flow independently from a control of the plural louvers by the adjustment device,
    wherein the at least one actuation element made from the shape memory alloy is coupled with or between at least one slide, the at least one slide includes a first interlocking element which cooperates with a second interlocking element configured as a spring element and forms a disengageable interlocking connection in a disengageable interlocking position with a support rail.

* * * * *